United States Patent
Norton et al.

(10) Patent No.: US 7,311,414 B2
(45) Date of Patent: Dec. 25, 2007

(54) ORNAMENTAL LAMP ASSEMBLY

(75) Inventors: M. Brent Norton, 2258 N. 460 East, Provo, UT (US) 84601; Stephen P. Watts, Orem, UT (US); Lance Larson, Orem, UT (US); Carlos Grimaldi, Orem, UT (US); Kim Calaway, Provo, UT (US); Clay DeGraft, Provo, UT (US); Kevin Chen, Pleasant Grove, UT (US)

(73) Assignee: M. Brent Norton, Provo, UT (US)

( * ) Notice: Subject to any disclaimer, the term of this patent is extended or adjusted under 35 U.S.C. 154(b) by 23 days.

(21) Appl. No.: 10/866,450

(22) Filed: Jun. 11, 2004

(65) Prior Publication Data

US 2006/0139912 A1    Jun. 29, 2006

Related U.S. Application Data

(60) Provisional application No. 60/478,001, filed on Jun. 12, 2003.

(51) Int. Cl.
*F21S 6/00* (2006.01)

(52) U.S. Cl. ............... 362/122; 362/806; 362/183; 362/158; 362/191

(58) Field of Classification Search ........ 362/122, 362/158, 198, 191, 806, 183, 186
See application file for complete search history.

(56) References Cited

U.S. PATENT DOCUMENTS

| | | | |
|---|---|---|---|
| 4,702,140 A | 10/1987 | Goldfarb | 84/1.01 |
| 4,999,060 A | 3/1991 | Szekely et al. | 136/251 |
| 5,003,439 A | 3/1991 | Yang | 362/153 |
| 5,003,441 A | 3/1991 | Crowe et al. | 362/183 |
| 5,041,952 A | 8/1991 | Janda et al. | 362/183 |
| 5,055,984 A | 10/1991 | Hung et al. | 362/183 |
| 5,086,267 A | 2/1992 | Janda et al. | 325/350 |
| 5,155,668 A | 10/1992 | Tanner et al. | 362/183 |
| 5,221,891 A | 6/1993 | Janda et al. | 323/350 |
| 5,251,112 A * | 10/1993 | Chen | 362/118 |
| 5,313,377 A | 5/1994 | Kasboske | 362/122 |
| 5,367,442 A | 11/1994 | Frost et al. | 362/183 |
| 5,404,343 A | 4/1995 | Boggio | 369/19 |
| 5,558,422 A | 9/1996 | Sanford | 362/32 |
| 5,630,660 A * | 5/1997 | Chen | 362/183 |
| 6,013,985 A | 1/2000 | Green et al. | 315/149 |
| 6,082,877 A | 7/2000 | Hughes | 362/360 |
| 6,120,165 A | 9/2000 | Shalvi | 362/276 |
| 6,253,489 B1 | 7/2001 | Sung et al. | 47/65.7 |
| 6,263,601 B1 | 7/2001 | Emert | 40/564 |
| 6,364,501 B1* | 4/2002 | Tai | 362/122 |
| 6,364,503 B1 | 4/2002 | Wenzel et al. | 362/186 |
| 6,398,386 B1* | 6/2002 | Huang | 362/653 |
| 6,406,163 B1 | 6/2002 | Yang | 362/183 |
| 6,517,217 B1 | 2/2003 | Liao | 362/235 |
| 6,761,466 B1* | 7/2004 | Cheng | 362/189 |
| 6,926,423 B2* | 8/2005 | Bucher et al. | 362/184 |
| 2002/0043012 A1* | 4/2002 | Shibata et al. | 40/546 |
| 2002/0176248 A1* | 11/2002 | Wismeth et al. | 362/159 |
| 2003/0072150 A1 | 4/2003 | Rizkin et al. | 362/183 |

* cited by examiner

*Primary Examiner*—Renee Luebke
*Assistant Examiner*—Zahra I. Bennett
(74) *Attorney, Agent, or Firm*—Kirton & McConkie; David B. Tingey (57) ABSTRACT

An ornamental lamp assembly incorporating a dual housing structure having an internal protective element and an external decorative element to protect functional circuitry from damage sustained as a result of normal outdoor use, and to facilitate achieving a selectively varied decor by interchanging the external decorative housing element with other external decorative housing elements having unique features.

20 Claims, 6 Drawing Sheets

ORNAMENTAL LAMP ASSEMBLY

RELATED APPLICATIONS

The present application claims priority to U.S. Provisional Patent Application No. 60/478,001 entitled, "Ornamental Solar-Powered Lamp and Method for Producing the Same," filed on Jun. 12, 2003 by Brent Norton, et al., incorporated herein in its entirety by reference.

BACKGROUND OF THE INVENTION

1. Field of the Invention

The present invention relates to ornamental lights, and more particularly to solar-powered ornamental lights for indoor and outdoor use.

2. Background and Related Art

Photovoltaic cells, commonly termed "solar cells," are well known in the art. Solar lamps utilize solar cells to collect solar energy and convert such energy to electricity to illuminate the lamp. Solar lamps typically comprise at least one solar cell, a battery, and a luminous body contained within a housing. The solar cell, battery and luminous body comprise a circuit wherein the solar cell collects sunlight and converts solar energy to electricity, the battery stores the electricity, and the luminous body uses the stored electricity to illuminate the solar lamp and surrounding area. A light sensor may be attached to the lamp to enable or disable the electrical connection between the battery and the luminous body, depending on the availability and magnitude of external light.

As a solar lamp's luminescence depends on the lamp's ability to harvest sunlight, the location and position of the solar cell is paramount to the lamp's effectiveness. Traditionally, solar lamps fix a solar cell on top of a housing in a horizontal position relative ground level. The solar cell is thus exposed and unobstructed to maximize the level of sunlight received throughout the day. Despite its utilitarian benefits, this structure substantially increases the likelihood that the solar panel or other sensitive components may sustain substantial and/or irreparable damage as a result of normal use, especially if used outdoors. Although the housing implemented in connection with such a structure may alleviate the risk of damage to internal components, damage to the solar cell will likely render the entire solar lamp inoperable. Replacement of a solar lamp thus damaged is likely to be both costly and inconvenient.

In addition, the manufacture and assembly processes required to implement a solar lamp having such a large number of independent, complex elements is likely to be complicated, time consuming and expensive. As each independent element of the solar lamp assembly is likely to be packaged together but unassembled, there is also a substantial likelihood that one or more elements may incur damage from mishandling or improper storage before purchase.

Traditional lamp assemblies, both solar and electrically or otherwise powered, are also limited in their aesthetic appeal after purchase. Although traditional lamp assemblies include ornamental features that may be desirable for use in a certain location or in connection with a certain event, it is often desirable to be able to modify the appearance of such ornamental features so that the lamp may be used in more than one location or in connection with more than one event. Such adaptability is particularly desirable as it relates to changing seasons and specific holidays. Indeed, a unitary lamp having ornamentation that may be selectively modified or interchanged to correspond to a new season or holiday requires much less space and expense than the variety of bulky holiday decorations typically found in residential garages and basements. Moreover, the functional benefits of a lamp are often desired regardless of any particular occasion. Selectively interchangeable ornamentation may enable a lamp to adapt to any occasion without impairing its general use.

Accordingly, what is needed is an ornamental lamp assembly that effectively protects a solar circuit, thereby reducing both the need to replace and/or repair the lamp and the costs associated therewith. Further what is needed is an ornamental lamp assembly that facilitates replacement of the battery without disturbing more sensitive components of the circuit. What is also needed is an ornamental lamp assembly that facilitates manufacture and assembly of the lamp while reducing the likelihood of damage before purchase. Finally, what is needed is an ornamental lamp assembly that enables the decorative effect of the lamp to be easily and inexpensively varied as desired to enhance and/or alter the look and feel of the area in which the lamp is located.

The present invention overcomes the foregoing and other disadvantages of the prior art by providing a novel and improved ornamental lamp assembly.

SUMMARY OF THE INVENTION

The present invention is an ornamental lamp assembly that utilizes a dual housing to protect the internal components and circuitry of the lamp while facilitating a selectively varied decor. Specifically, the ornamental lamp assembly of the present invention comprises a mount portion and a dual housing removably attached to the mount portion. The dual housing may incorporate an external decorative element and an internal protective element. An internal protective element functions to retain at least a portion of a functional circuit used to illuminate the lamp. In one embodiment, an internal protective element retains at least a portion of a solar circuit comprising at least one solar cell, a battery, and a luminous body. Preferably, the internal protective element houses the solar cell and luminous body and is operatively connected to the battery such that the battery may be removed and replaced without disturbing the more sensitive components of the solar circuit contained within the internal protective element.

According to one aspect of the present invention, the external decorative element is independent of both the internal protective element and the mount portion such that the external decorative element may be easily interchanged with another external decorative element having unique features. In this manner, the decorative effect of the lamp may be selectively and inexpensively changed to enhance or alter the look and feel of the area in which it is located.

According to another aspect of the present invention, the mount portion incorporates ornamental features and effects to complement the dual housing. In certain embodiments, the mount portion may include a stake for mounting the ornamental lamp outdoors in the ground. The mount portion may incorporate an annular recess to receive the battery component of the solar circuit such that when the internal protective element is connected to the mount portion, the battery is operatively connected to the functional circuitry contained within the internal protective element, thus completing the circuit.

An object of the present invention is to provide an ornamental lamp assembly that minimizes the likelihood of damage to components of the circuitry to reduce costs associated with repairing and/or replacing the ornamental lamp.

Another object of the present invention is to provide an ornamental lamp assembly that facilitates replacement of the battery without disturbing more sensitive components of the circuitry.

Another object of the present invention is to provide an ornamental lamp assembly that facilitates manufacture and assembly of the lamp while reducing a likelihood of damage before purchase.

Another object of the present invention is to provide an ornamental lamp assembly that enables the decorative effect of the lamp to be easily and inexpensively varied as desired to enhance and/or alter the look and feel of the area in which the lamp is located.

These and other features and advantages of the present invention will be set forth or will become more fully apparent in the description that follows. The features and advantages may be realized and obtained by means of the instruments and combinations particularly pointed out in the appended claims. Furthermore, the features and advantages of the invention may be learned by the practice of the invention or will be obvious from the description, as set forth hereinafter.

BRIEF DESCRIPTION OF THE DRAWINGS

The foregoing and other objects and features of the present invention will become more fully apparent from the following description and appended claims, taken in conjunction with the accompanying drawings. Understanding that these drawings depict only typical embodiments of the invention and are, therefore, not to be considered limiting of its scope, the invention will be described and explained with additional specificity and detail through the use of the accompanying drawings in which:

DETAILED DESCRIPTION OF THE INVENTION

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes that come within the meaning and range of equivalency of the claims are to be embraced within their scope.

As used in this specification, the term "ornamental lamp" refers to a lamp appropriate for indoor and outdoor use that may utilize a solar circuit, low voltage electricity, or other power source as a primary source of energy. The term "solar circuit" refers to a circuit comprising at least one solar cell, a battery and a luminous body or other output mechanism. The term "luminous body" refers to an electric bulb, illuminating diode, or any other device known to those in the art by which to convert electrical energy into optical energy.

Figure 1:
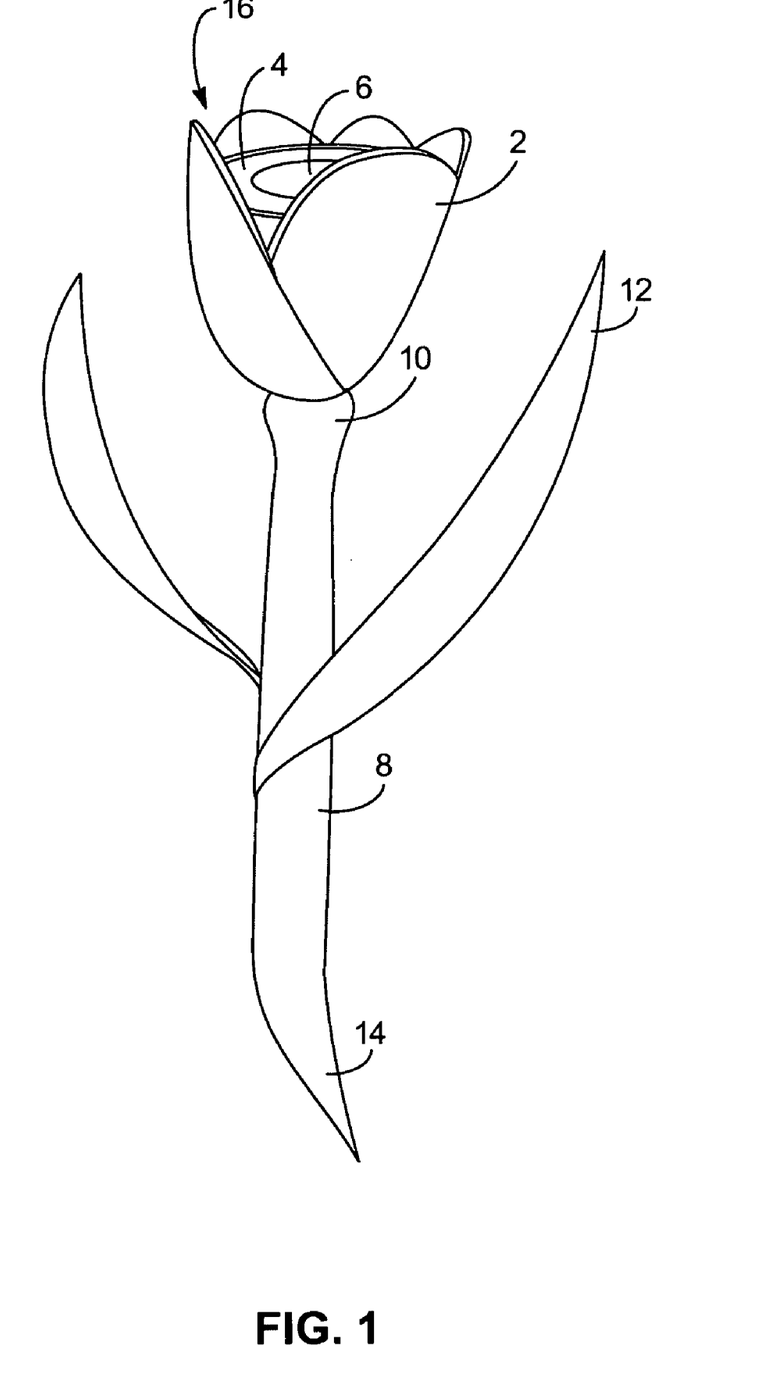
FIG. 1 is a perspective view of an ornamental lamp assembly in accordance with certain embodiments of the present invention.

The present invention comprises an ornamental lamp assembly that provides a dual housing to protect the sensitive components of the lamp's functional circuitry and to facilitate a selectively varied decor. Referring to FIG. 1, certain embodiments of an ornamental lamp assembly in accordance with the present invention comprise a dual housing 16 having an external decorative housing element or ornamental housing 2 and an internal protective housing element 4. An external decorative housing element 2 may surround a portion or the entire internal decorative housing element 4 such that the external decorative housing element 2 provides an additional layer of protection for the functional components contained within the internal protective element 4. The external decorative housing element 2 may be comprised of a substantially rigid translucent material such that, in certain embodiments, solar energy may traverse the external decorative housing element 2 to penetrate the solar cell 6 of the internal protective element 4. In addition, such a translucent material enables the external decorative housing element 2 to be illuminated by a luminous body 22 contained therein. According to certain embodiments of the present invention, the external decorative element 2 comprises frosted translucent plastic such that the decorative features of the external decorative element 2 may be distinguished and recognized even under minimal or no ambient light. In addition, the external decorative housing element 2 may comprise one or several apertures for decorative and/or utilitarian purposes. For example, several pinhole openings may be provided over the surface area of the external decorative element 2 to disperse light emitted by the luminous body in an aesthetically pleasing manner. Additionally, several openings may be provided on a lower surface of the external decorative housing element 2 to drain condensation or other water from therein.

The external decorative housing element 2 may be removably attached to the internal protective element 4 by way of, for example, a press fit, a selectively releasable lock, complementary threads, or any other releasably attachable device or mechanism known to those in the art. Alternatively, both the external decorative element 2 and internal protective element 4 may be releasably coupled to a mount portion 8 of the ornamental lamp assembly such that the mount portion 8 indirectly fixes the relationship between the external decorative housing element 2 and an internal protective housing element 4.

An external decorative element 2 may comprise any shape or configuration capable of surrounding a portion or whole of the internal protective element 4. Specifically, the external protective element 2 may comprise the shape of a flower bloom or bud corresponding to a tulip, a rose, a daisy, or any other variety of flower known to those in the art. Alternatively, the external decorative element 2 may comprise a holiday, seasonal, or other special occasion theme, for example, a pumpkin, a jack-o-lantern, a Santa Claus, snowman, birthday cake, heart, sun, flag, bird house or any other shape corresponding to a particular holiday, season or other special occasion known to those in the art. An external decorative element 2 may also comprise commercial advertising, a residential name or address, or any other message or information. An external decorative element 2 may be selectively modified or interchanged to correspond to an alternative theme, occasion or message, or to provide an alternative aesthetically pleasing housing for general use.

An external decorative element 2 may be removably attached to a mount portion 8 by way of, for example, a magnetic, hydraulic or mechanical device or by a press fit, or any other means known to those in the art. A mount portion 8 may have any shape capable of receiving and retaining a dual housing 16 as discussed above. Specifically, a mount portion 8 may comprise an elongate supporting rod, a broad supporting base, or any other supporting means known in the art. A mount portion 8 may further comprise a reinforced proximal end 10. The reinforced proximal end 10 may comprise a diameter larger than the diameter corresponding to the portion of the mount portion 8 immediately adjacent the proximal end 10 such that the reinforced proximal end 10 may better support the weight and bulk of the dual housing 16.

A reinforced proximal end 10 may also comprise an annular recess 36 to receive and retain the external decorative element 2 and/or the internal protective element 4. The annular recess 36 may have a depth and circumference sufficient to accommodate a battery 24. According to certain embodiments of the present invention, the battery 24 and internal protective element 4 may be operatively connected by way of the annular recess 36 to complete a solar circuit. The features of this relationship are discussed in detail with reference to FIG. 2 below.

The mount portion 8 may further comprise ornamentation to complement the ornamental characteristics of the external decorative element 2. For example, where the external decorative element 2 is configured to resemble a flower, the mount portion 8 may comprise a green latex outer shell or other like material to resemble a flower stem. The mount portion 8 may also incorporate synthetic "leaves" attached thereto. Similarly, where the ornamental lamp assembly comprises a winter holiday theme, the external decorative element 2 may be configured to resemble a snowman, and the mount portion 8 may evidence red and white striping resembling a candy cane. The mount portion 8 may also be selectively modified or interchanged as desired.

Figure 2:
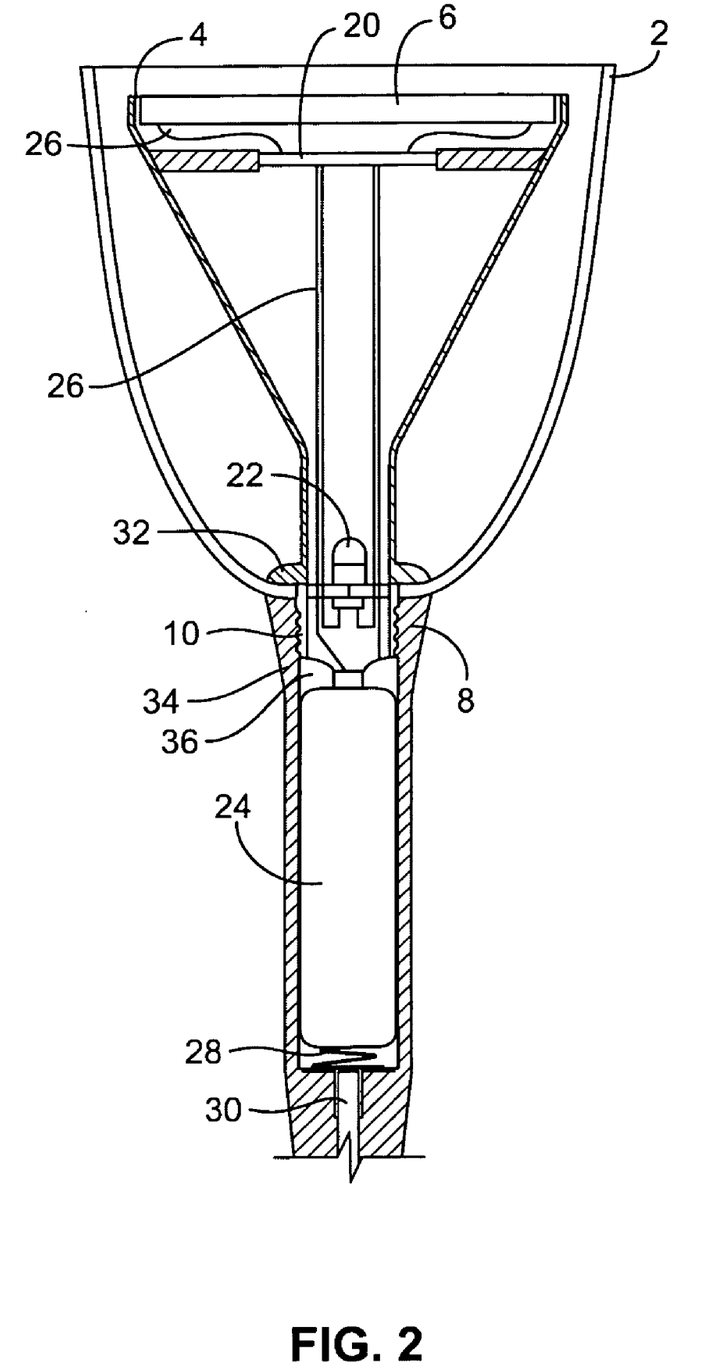
FIG. 2 is a cross-sectional view of the ornamental lamp assembly of FIG. 1.

Referring now to FIG. 2, an internal protective element 4 in accordance with certain embodiments of the present invention may house at least one, and preferably two, components of a solar circuit. In this manner, an internal protective element 4 simplifies the manufacture and assembly of the ornamental lamp and reduces a likelihood of damage to solar circuit components prior to purchase. Indeed, as at least one component of a solar circuit is manufactured to reside within the internal protective element 4, fewer steps are required for assembly. The internal protective element 4 also provides protection for the solar circuit component housed therein prior to assembly and use.

Specifically, a solar cell 6 may be fixedly mounted beneath the topmost surface of an internal protective element 4. According to this embodiment, the internal protective element 4 may comprise a substantially rigid, translucent material such that it may protect the solar cell 6 from damage while enabling solar energy to traverse its surface and be absorbed and converted into electricity by the solar cell 6. The density and depth of the internal protective element 4 may vary such that the dimensions and attributes of the topmost surface of the internal protective element 4 are more amenable to the passage of solar energy therethrough than adjacent surfaces of the internal protective element 4. An internal protective element 4 may comprise any shape or configuration capable of being retained by a mount portion 8 and substantially enveloped by an external decorative element 2. In certain embodiments an internal protective element 4 resembles a floodlight housing having a solar cell 6 coupled to the face of the glass envelope and a luminous body 22 mounted near the screw cap.

According to certain embodiments of the present invention, the solar cell 6 is configured to occupy the least amount of internal protective element 4 surface area while enabling the solar cell 6 to attract and receive a maximum of solar energy. In this manner, the light produced by an affiliated luminous body 22 may be perceived to illuminate portions of the external decorative element 2 that may extend upwards beyond the surface of the internal protective element 4. Such calculated engineering facilitates one's ability to distinguish the identifying outline and features of the external decorative element 2 even under sub-optimal ambient lighting conditions.

The solar cell 6 may be wired directly to a battery 24 through a diode, which prevents the battery's current from flowing back through the solar cell 6 when there is no incoming solar energy. Alternatively, in certain embodiments of the present invention implementing a photoresistor 38, the solar cell may be wired first to a controller board 20, such as a printed circuit board ("PCB"), that implements a transistor and/or relay to control the output produced by the luminous body 22. The controller board 20 accepts power from the solar cell 6 and battery 24, as well as input from the photoresistor 38. The controller board 20 enables the luminous body 22 to illuminate the solar lamp when the photoresistor 38 indicates darkness. In alternative embodiments of the present invention, the controller board 20 enables the luminous body 22 to illuminate the solar lamp upon activation of an on/off switch located on the surface of the solar lamp. A controller board 20 may also enable the luminous body 22 to create a pulsating, flashing or intermittent light upon activation. In any case, the controller board 20 may be mounted within the internal protective element 4, on an external surface of the internal protective element 4, or on a surface of any other portion of the ornamental lamp assembly capable of communicating with the controller board 20.

According to certain embodiments of the present invention, a wire 26 connects the solar cell 6 to the battery 24, either directly or indirectly through a controller board 20. The wire 26 may terminate short of the battery 24 at the distal end 40 of the internal protective element 4. The distal end 40 of the internal protective element 4 may then be placed substantially adjacent to the battery 24, such that the connective wire 26 and the battery 24 are operatively connected and in electrical communication with one another.

According to certain embodiments of the present invention, the battery 24 component may be housed within an annular recess 36 disposed at a proximal end 10 of the mount portion 8 such that the battery 24 may be easily removed and replaced as necessary without disturbing more sensitive components of the circuitry contained within the internal protective housing element 4. The battery 24 may be supported within the mount portion 8 by a supporting spring 28 similar to those found in battery-operated devices generally.

Figure 3:
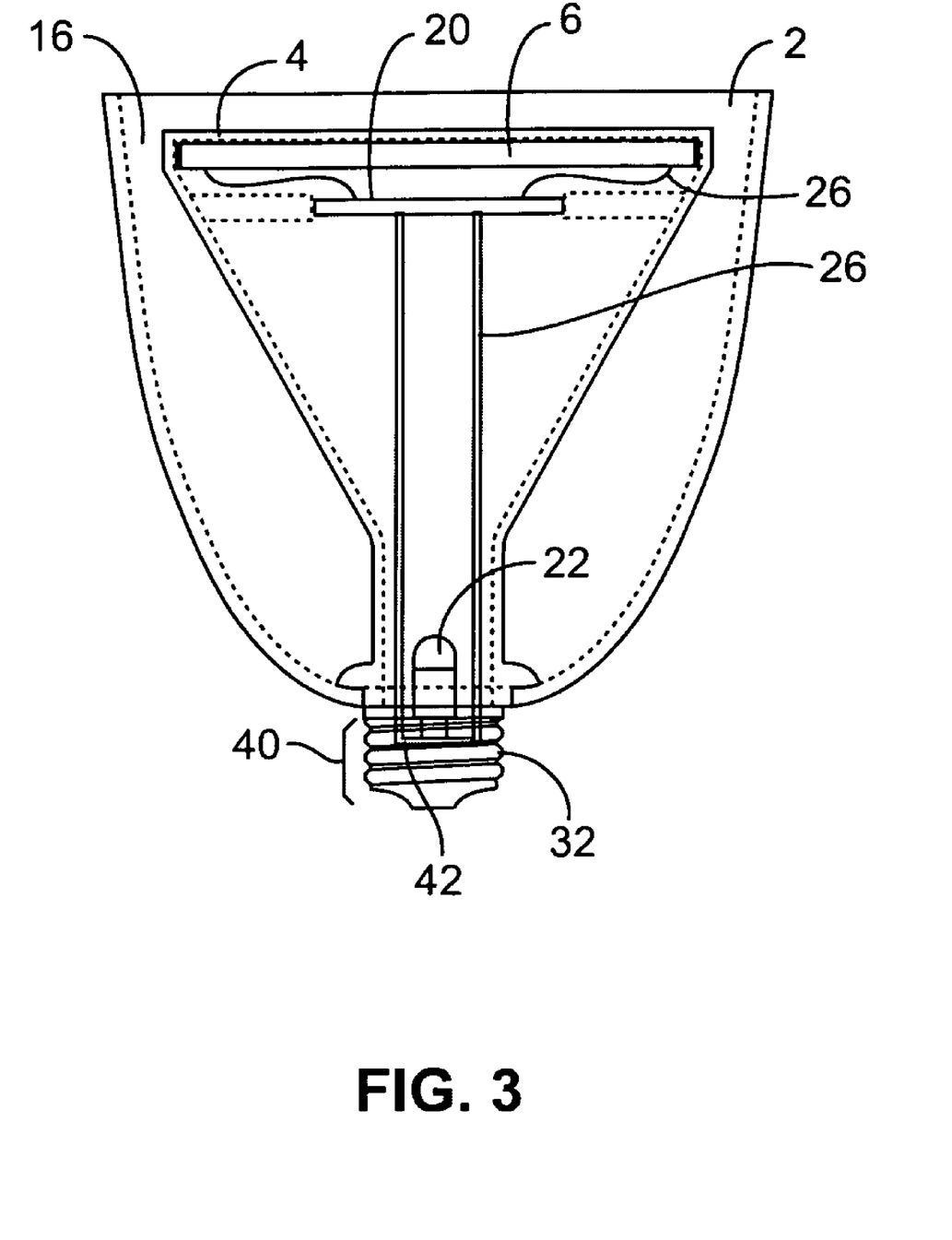
FIG. 3 is an isolated cross-sectional view of the dual housing component of the ornamental lamp assembly of FIG. 1.

Referring now to FIG. 3, a luminous body 22 may be implemented at a distal end of an internal protective element 4 to direct a maximum level of illumination upwards relative to a dual housing 16 supported on a mount portion 8.

Alternatively, a luminous body 22 may be suspended intermediate the top surface of the internal protective element 4 and the distal end of the internal protective element 4 to generally illuminate the dual housing 16, or near or at the top surface of the dual housing 16 to direct illumination largely downwards, depending on the orientation and ornamental features of the particular ornamental lamp assembly.

According to certain embodiments of the present invention, a distal end 40 of an internal protective element 4 comprises a screw cap 42 having external threads 32 disposed thereon. Such external threads 32 may complement internal threads 34 disposed within an annular recess 36 of the mount portion 8 such that the internal protective element 4 may be retained in a substantially fixed relationship with the mount portion 8 upon integrating the external and internal threads 32 and 34, as seen in FIG. 2. Also, certain embodiments of the present invention provide that, when the external and internal threads 32 and 34 are integrated as discussed above, a battery 24 disposed within the annular recess 36 may communicate with the circuitry components retained within the internal protective element 4.

Figure 4:
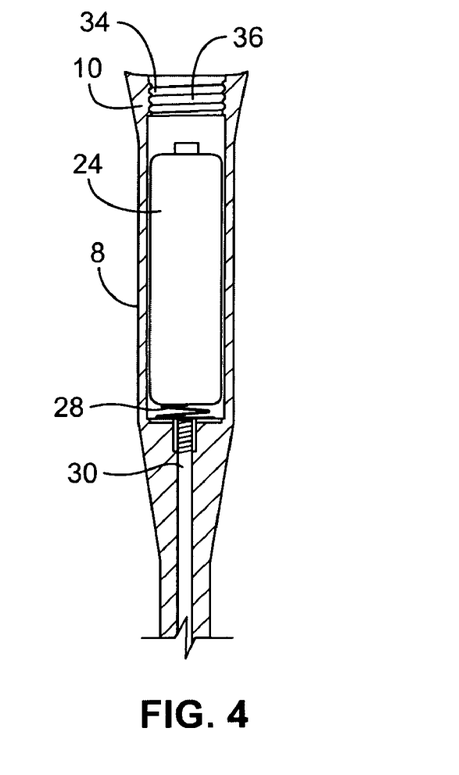
FIG. 4 is an isolated cross-sectional view of the mount portion of the ornamental lamp assembly of FIG. 1.

Referring to FIG. 4, an ornamental lamp assembly in accordance with the present invention may comprise a mount portion 8 having an annular recess 36 therein for receiving and retaining one or more batteries 24. An annular recess 36 may comprise internal threads 34 proximate its proximal end 10 such that a complementary housing may be received and retained thereby. As discussed above with reference to FIG. 2, coupling an internal protective element 4 to a mount portion 8 by way of an annular recess 36 may enable an internal protective element 4 to operatively connect to a battery 24 residing within the annular recess 36. Where the internal protective element 4 houses a solar cell 6 and a luminous body 22 or other output mechanism, the battery 24 completes the solar circuit, thus rendering the ornamental lamp assembly functional.

According to certain embodiments of the present invention, the mount portion 8 may incorporate a resilient base support 30 therein. A resilient base support 30 may comprise metal wire, jointed plastic or metal, or any other means known to those in the art by which to render the mount portion 8 capable of flexing to assume and retain a desired position. In this manner, a resilient based support 30 may, for example, be releasably secured around a railing, pole, or other structure. Alternatively, the mount portion 8 may incorporate a substantially rigid supporting element having a surface area sufficient to enable the solar-powered lamp to reside on a flat surface such as a table or stair. According to certain embodiments of the present invention, the mount portion 8 may include optional fastening means 14 to further secure the lamp with respect to an adjacent surface. Fastening means 14 may include, for example, a stake, screw, bolt, bracket, nail, adhesive, suction cup, or any other means known to those in the art by which to secure a lamp to an adjacent surface.

Figure 5:
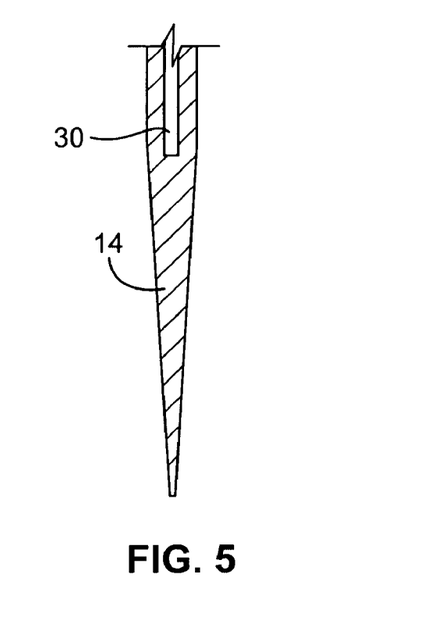
FIG. 5 is an isolated cross-sectional view of the mount portion connected to a ground stake in accordance with certain embodiments of the present invention.

Referring now to FIG. 5, fastening means 14 may include a ground stake portion removably or integrally coupled to a mount portion 8 to facilitate mounting the ornamental lamp assembly outdoors in the ground. In certain embodiments of the present invention, the ground stake portion or other fastening means 14 may be removably attached to the mount portion 8 by an internal screw, complementary threads, a press fit or by any other means known to those in the art.

Figure 6:
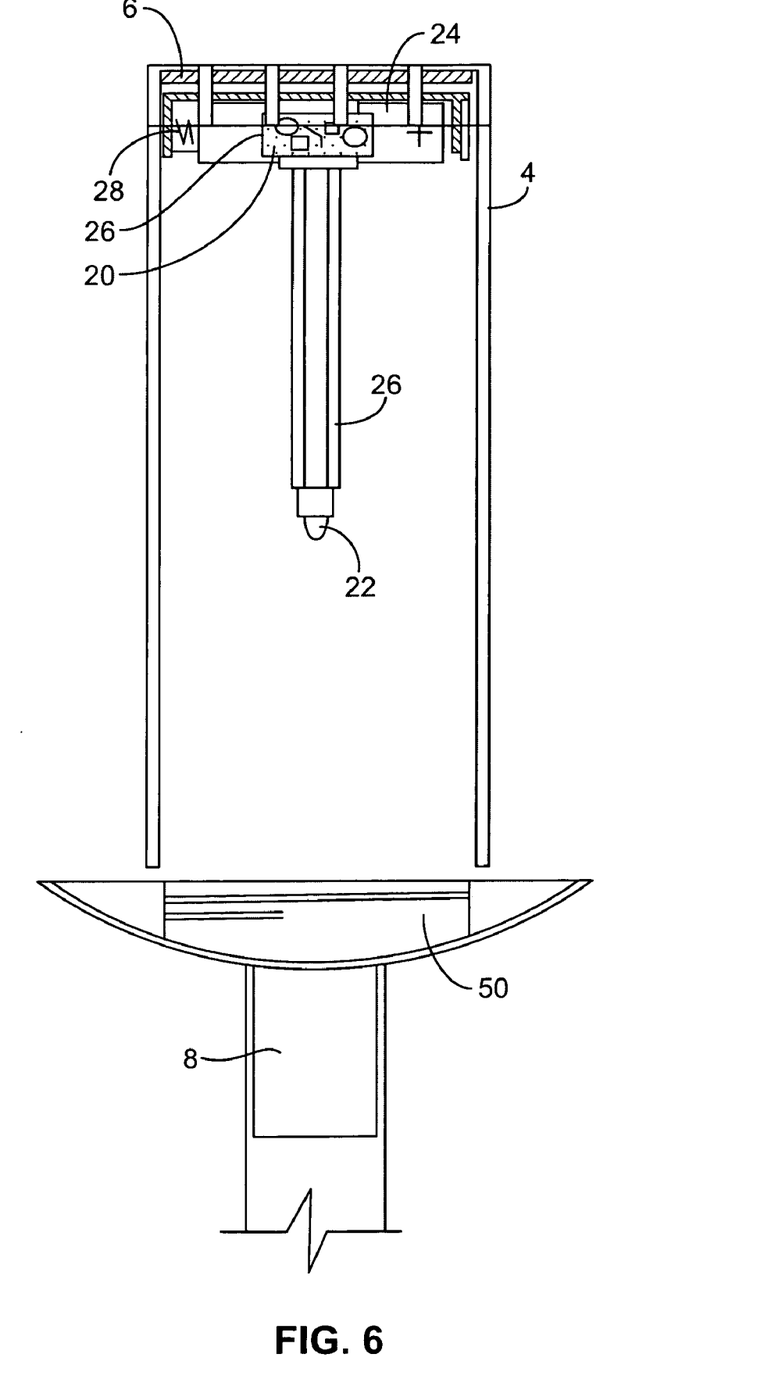
FIG. 6 is a cross-sectional view of an alternate embodiment of the internal protective element and mount portion in accordance with certain embodiments of the present invention.

Referring to FIG. 6, certain alternate embodiments of the internal protective element 4 of the present invention may retain an entire solar or other power circuit. For example, an internal protective element 4 may comprise a translucent or transparent cylinder capable of connecting, at one end, to a mount portion 8. Such a mount portion 8 may incorporate a reflective element 50 to facilitate illumination of the ornamental lamp assembly. A reflective element 50 may be dome-shaped, box-shaped, or may assume any shape or configuration known to those in the art to increase illumination. A second end of the internal protective element 4 may be configured to receive a sealing cap 54. A sealing cap 54 may comprise a circumference slightly larger than the circumference of the internal protective element 4 such that the sealing cap may be retained thereon by a press fit. Alternatively, the sealing cap may be retained by a selectively releasable locking device actuated by any mechanical, hydraulic or magnetic means, or by any other means known in the art. A sealing cap 54 may incorporate a solar circuit thereon, comprising a solar cell 6, battery 24, and luminous body 22. The luminous body 22 may be suspended from the sealing cap 54 by lead wires of any length, thereby enabling retention of the luminous body 22 at any position along the length of the internal protective element 4. The sealing cap may also incorporate a controller board 20 and photoresistor 38 similar to those discussed above. In this manner, the internal protective element 4 may quickly and effectively receive and retain the solar circuit when the sealing cap 54 is attached. The solar circuit may also be easily removed for repair or replacement as necessary.

Figure 7:
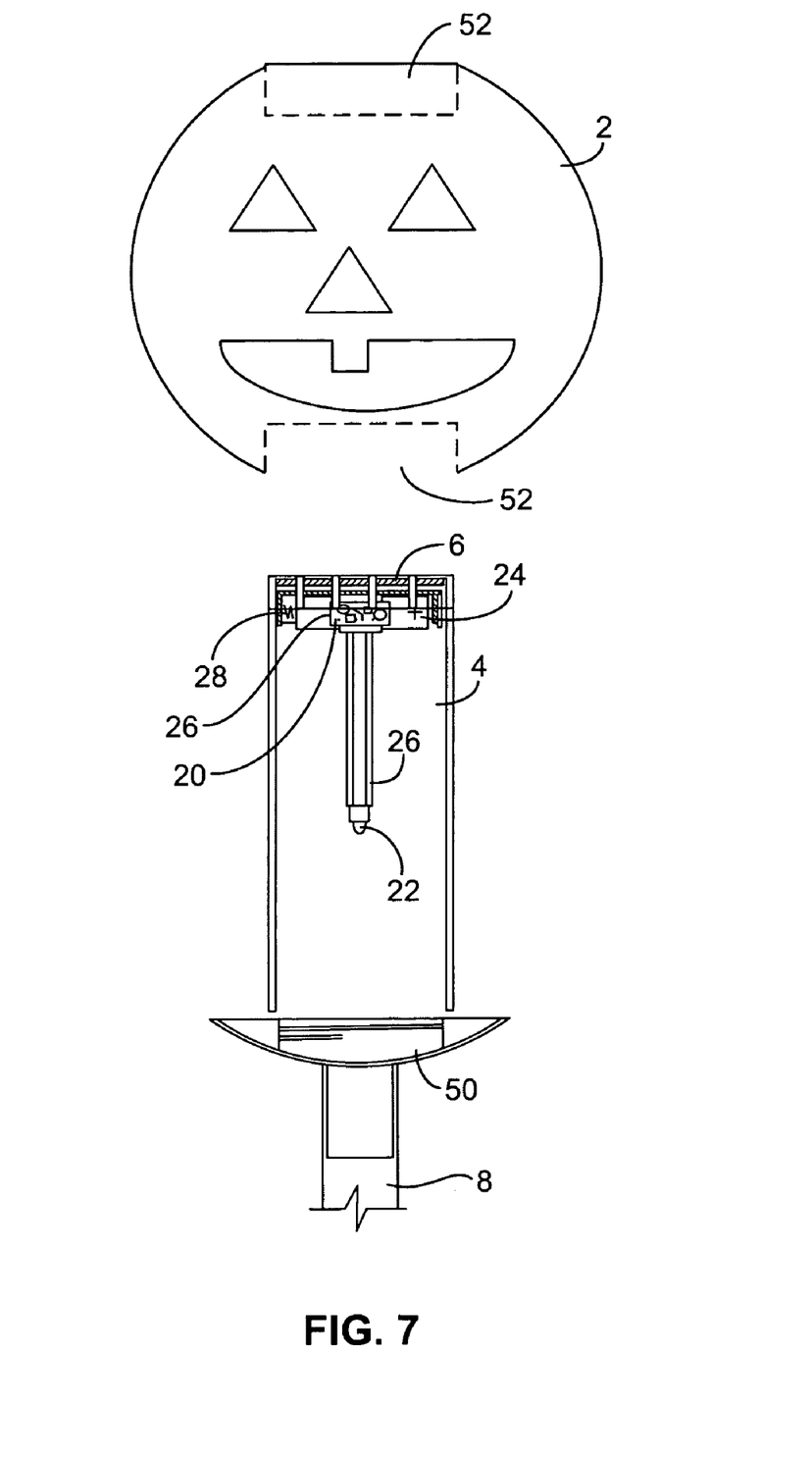
FIG. 7 is a cross-sectional perspective view of the dual housing and mount portion in accordance with certain embodiments of the present invention in combination with the internal protective element of FIG. 6.

Referring now to FIG. 7, the internal protective element 4 configuration of FIG. 6 may receive an external decorative element 2 having a bore 52 therethrough. The external decorative element 2 may be selectively retained by active locking means as discussed above, or may balance on the distal end 10 of the mount portion 8. Indeed, where the distal end 10 of the mount portion 8 provides a base substantially broader than the mount portion 8 generally, balancing the external decorative element 2 on such base minimizes the time and expense associated with assembling the ornamental lamp assembly. The circumference of the bore 52 preferably corresponds to the circumference of the internal protective element 4 while the length of the external decorative element preferably substantially corresponds to the length of the internal protective element 4 such that the sealing cap 54 only slightly protrudes through the bore 52, thus concealing the bore 52 and minimizing any gap between the internal protective element 4 and the external decorative element 2.

What is claimed is:

1. An ornamental lamp assembly comprising:
   a mount portion; and
   a dual housing unit removably coupled to the mount portion, the dual housing unit comprising;
   an internal protective element that contains a solar cell and a luminous body, wherein said internal protective element comprises a substantially translucent material that enables solar energy to traverse the internal protective element so as to be absorbed and converted into electricity by the solar cell; and
   an external decorative element surrounding at least a portion of the internal protective element and comprising a substantially translucent material that enables solar energy to traverse the external decorative element and enables the external decorative element to be illuminated by the luminous body.

2. The ornamental lamp assembly of claim 1, wherein said internal protective element is hermetically sealed.

3. The ornamental lamp assembly of claim 1, wherein said mount portion contains a battery.

4. The ornamental lamp assembly of claim 3, wherein said battery is configured to be operatively connected with the internal protective element to complete a solar circuit.

5. The ornamental lamp assembly of claim 1, wherein said internal protective element is universally compatible with a variety of shapes corresponding to said external decorative element.

6. The ornamental lamp assembly of claim 1, wherein said external decorative element has a shape corresponding to at least one of a flower, a special occasion, and a holiday theme.

7. The ornamental lamp assembly of claim 1, further comprising fastening means coupled to said mount portion for securing said ornamental lamp assembly against an adjacent surface.

8. The ornamental lamp assembly of claim 1, wherein said mount portion is flexibly resilient such that said mount portion may be selectively oriented to retain various configurations according to aesthetic and utilitarian purposes.

9. An ornamental lamp comprising:
a mount portion comprising a battery;
an internal protective housing removably coupled to said mount portion, wherein said internal protective housing contains a solar cell and a luminous body, and wherein said internal protective housing comprises a substantially translucent material that enables solar energy to traverse the internal protective housing so as to be absorbed and converted into electricity by the solar cell, and wherein the solar cell, the luminous body and the battery are operatively connected to complete a solar circuit; and
an external decorative housing removably coupled to at least one of said mount portion and said internal protective housing, wherein said external decorative housing substantially surrounds at least a portion of said internal protective housing and comprises a substantially translucent material that enables solar energy to traverse the external decorative housing and enables the external decorative housing to be illuminated by the luminous body.

10. The ornamental lamp of claim 9, wherein said internal protective housing is hermetically sealed.

11. The ornamental lamp of claim 9, wherein said internal protective housing is universally compatible with a variety of shapes corresponding to said external decorative housing.

12. The ornamental lamp of claim 9, wherein said external decorative housing has a shape corresponding to at least one of a flower, a special occasion, and a holiday theme.

13. The ornamental lamp of claim 9, further comprising fastening means coupled to said mount portion for securing said ornamental lamp assembly against an adjacent surface.

14. The ornamental lamp of claim 9, wherein said mount portion is flexibly resilient such that said mount portion may be selectively oriented to retain various configurations according to aesthetic and utilitarian purposes.

15. An ornamental lamp comprising:
a mount portion having a first end and a second end, said first end comprising an annular recess to receive and retain a battery;
an internal protective housing removably coupled to said first end of said mount portion, wherein said internal protective housing has a hermetically closed volume and contains a solar cell and a luminous body, and wherein said internal protective housing comprises a substantially translucent material that enables solar energy to traverse the internal protective housing so as to be absorbed and converted into electricity by the solar cell, and wherein the solar cell, the luminous body and the battery are operatively connected to complete a solar circuit; and
an external decorative housing removably coupled to at least one of said mount portion and said internal protective housing, wherein said external decorative housing substantially surrounds at least a portion of said internal protective housing and comprises a substantially translucent material that enables solar energy to traverse the external decorative housing and enables the external decorative housing to be illuminated by the luminous body.

16. An ornamental lamp of claim 15, wherein said external decorative housing is configured to be selectively interchanged with another external decorative housing that is selectively coupled to at least one of said mount portion and said internal protective housing, wherein said another external decorative housing substantially surrounds at least a portion of said internal protective housing when selectively coupled and comprises a substantially translucent material that enables solar energy to traverse the external decorative housing and enables the external decorative housing to be illuminated by the luminous body when selectively coupled.

17. An ornamental lamp of claim 15, wherein said external decorative housing comprises a plurality of aperatures over a surface area of said external decorative housing to disperse light emitted from the luminous body.

18. An ornamental lamp of claim 15, wherein the solar cell, the luminous body and the battery are operatively connected through an annular recess to complete the solar circuit.

19. An ornamental lamp of claim 15, wherein the luminous body is suspended from a top surface of the internal protective housing.

20. An ornamental lamp of claim 15, wherein the luminous body comprises an illuminating diode.

* * * * *